UNITED STATES PATENT OFFICE.

JOHN F. DICKSON, OF BINGHAMTON, NEW YORK.

PAINT AND VARNISH REMOVER.

No. 871,790.

Specification of Letters Patent.

Patented Nov. 26, 1907.

Application filed March 8, 1907. Serial No. 361,376.

*To all whom it may concern:*

Be it known that I, JOHN F. DICKSON, a citizen of the United States, residing at Binghamton, New York, have invented certain new and useful Improvements in Paint and Varnish Removers, of which the following is a specification.

My said invention relates to a composition for the removal of all kinds of paints, varnishes and shellac.

The object of the invention is to produce an inexpensive remover which will be rapid in its action and capable by one application of removing all kinds of paints, varnishes and shellac from wood surfaces without raising the grain of the wood or discoloring it.

I have further aimed to provide a composition not injurious to the hands or detrimental to the health of the user, and one which will be free from any disagreeable odor and which may be used without danger of fire.

I have found that acetone is a practical solvent for certain gums, such for instance as shellac, sandarac, and mastic, but will not dissolve dammar gum or gum arabic, which are also extensively used in the making of varnishes. I have also found that benzol is an effectual solvent for dammar gum, gum arabic, gutta percha and the oily substances which are used in paints and varnishes, and further, that toluol when used in connection with the other ingredients increases the solvent qualities of the other chemicals and causes the paints and varnishes to be the more readily dissolved or softened. These three liquids when mixed in the proportions hereinafter specified, and applied to a painted surface, will, in a very few minutes, thoroughly soften any paint that may have been applied thereto and bring it to such a condition that it may be easily removed with a putty knife or piece of waste saturated with the solution, leaving the wood surfaces bare and in a perfect condition for refinishing without the necessity of smoothing or polishing. It is necessary, however, to provide some means which will retard the evaporation and which will also thicken the mixture so that it may be applied to vertical surfaces and yet be retained thereon for sufficient length of time to allow the solvents to act.

Many attempts have been made to provide substances or compounds which would serve to retain solvents of various kinds upon painted surfaces, but none of these, so far as I am aware, have been at all successful, with the exception of gums which are open to various objections.

In my experiments with inert substances, other than gums as thickening means, I have found that some of these tend to settle too readily, and in many instances to have a discoloring effect upon the wood surface. Others, such for instance as chalk, lime and the like, tend on the evaporation of the solvents to form a hard coating which is nearly as difficult to remove as the paint itself.

After repeated experiments I have found that pulverized alum mixed in the proper proportion with the above mentioned solvents will produce a fluid of sufficient viscosity to cause it to remain upon vertical surfaces and to retain the solvents a sufficient time to enable them to thoroughly soften the paint to be removed. The proportions which I have found most suitable are as follows:—one part of pulverized alum to three parts of a mixture consisting of 8 parts of acetone, two parts of benzol and two parts of toluol.

Having thus described my invention, what I claim is:—

1. A paint and varnish remover containing acetone, benzol, toluol and pulverized alum, in substantially the proportions specified.

2. A paint and varnish remover consisting of one part of pulverized alum and three parts of a mixture consisting of 8 parts of acetone, two parts of benzol and two parts of toluol, substantially as specified.

In testimony whereof I affix my signature in presence of two witnesses.

JOHN F. DICKSON

Witnesses:
JAMES M. SPEAR,
HENRY E. COOPER.